US007333979B2

(12) United States Patent
Kobayashi

(10) Patent No.: US 7,333,979 B2
(45) Date of Patent: Feb. 19, 2008

(54) IMAGE PROCESSING APPARATUS HAVING WEB SERVER FUNCTION

(75) Inventor: Hiroki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 436 days.

(21) Appl. No.: 10/647,503

(22) Filed: Aug. 26, 2003

(65) Prior Publication Data
US 2004/0093345 A1    May 13, 2004

(30) Foreign Application Priority Data
Sep. 3, 2002  (JP)  ............................. 2002-258190
Aug. 12, 2003 (JP)  ............................. 2003-292492

(51) Int. Cl.
*G06F 17/30*   (2006.01)

(52) U.S. Cl. ..................... 707/4; 707/2; 707/3; 707/10; 707/101; 707/104.1

(58) Field of Classification Search ..................... None
See application file for complete search history.

(56) References Cited

U.S. PATENT DOCUMENTS

| 5,394,534 | A | * | 2/1995 | Kulakowski et al. | ....... 711/112 |
| 5,974,477 | A |   | 10/1999 | Kobayashi |  |
| 6,415,275 | B1 | * | 7/2002 | Zahn | ............................. 706/47 |
| 6,549,906 | B1 | * | 4/2003 | Austin et al. | .................. 707/10 |
| 6,714,950 | B1 | * | 3/2004 | Ferguson | .................... 707/201 |

(Continued)

FOREIGN PATENT DOCUMENTS

JP    2000-105717    4/2000

(Continued)

OTHER PUBLICATIONS

D. Burleson, "Oracle architectural design tips", Apr. 5, 2002. Available online at: http://builder.com.com/5100-6388-1045656.html. Accessed Aug. 21, 2006.*
"Compression" by Charles M. Kozierok, version date Apr. 17, 2001. Available online at http://pcguide.com/ref/hdd/file/ntfs/otherCompr-c.html.*

(Continued)

*Primary Examiner*—Neveen Abel-Jabl
*Assistant Examiner*—Mark Andrew X Radtke
(74) *Attorney, Agent, or Firm*—Dickstein Shapiro LLP

(57) ABSTRACT

An image processing apparatus, a method of creating a Web page, an image processing system, an information processing apparatus, and an information processing system are disclosed. The image processing apparatus includes a reception control part receiving a request for a Web page from a terminal connected to the image processing apparatus via a network, first storage means for storing a plurality of compressed document form information files, a decompression part decompressing at least one of the plurality of compressed document form information files in the first storage means into at least one document form data item, second storage means for storing the at least one document form data item, a Web page creation part using a document form data item in the second storage means to create the Web page, and a transmission control part sending the created Web page to the terminal.

6 Claims, 15 Drawing Sheets

U.S. PATENT DOCUMENTS

| | | | |
|---|---|---|---|
| 6,721,618 B2* | 4/2004 | Baek et al. | 700/121 |
| 6,760,884 B1* | 7/2004 | Vertelney et al. | 715/500.1 |
| 6,804,708 B1* | 10/2004 | Jerding et al. | 709/220 |
| 6,915,299 B1* | 7/2005 | Arcuri et al. | 707/100 |
| 6,988,025 B2* | 1/2006 | Ransom et al. | 700/295 |
| 2002/0107809 A1* | 8/2002 | Biddle et al. | 705/59 |
| 2002/0120697 A1* | 8/2002 | Generous et al. | 709/206 |
| 2003/0084152 A1* | 5/2003 | Chung | 709/225 |
| 2003/0120758 A1* | 6/2003 | Yassin et al. | 709/221 |
| 2003/0131072 A1 | 7/2003 | Kobayashi | |
| 2004/0030682 A1* | 2/2004 | Porter et al. | 707/3 |

FOREIGN PATENT DOCUMENTS

| | | |
|---|---|---|
| JP | 2001-007840 | 1/2001 |
| JP | 2002-149632 | 5/2002 |

OTHER PUBLICATIONS

"Best practices for NTFS compression in Windows" on Microsoft Knowledge Base, Revision 5.2, KB251186. Available online at http://support.microsoft.com/kb/251186.*

"NTFS Compression white paper" by Sanderson Forensices. Available online at http://www.sandersonforensics.co.uk/Files/NTFS%20compression%20white%20paper.pdf.*

Velasco, J.R. Benefits of Compression in HTTP Applied to Caching Architectures, Presented at 3rd International WWW Caching Workshop, Manchester, England, Jun. 15-17, 1998. Accessed Sep. 10, 2007. Available online at http://www.iwcw.org/1998/32manchester.html.*

Turau, V. 2002. A Caching System for Web Content Generated from XML Sources Using XSLT. In Proceedings of the Workshops on Advances in Object-Oriented information Systems J. Bruel and Z. Bellahsene, Eds. Lecture Notes in Computer Science, vol. 2426. Springer-Verlag, London, 197-206.*

* cited by examiner

FIG.10

| URL | XSL |
|---|---|
| topPage. cgi | topPage. xsl. z |
| getStatus. cgi | getStatus. xsl. z |
| inTray. cgi | inTray. xsl. z |
| outTray. cgi | outTray. xsl. z |

361

IMAGE PROCESSING APPARATUS HAVING WEB SERVER FUNCTION

BACKGROUND OF THE INVENTION

1. Field of the Invention

The present invention generally relates to an image processing apparatus, and more particularly to an image processing apparatus that can serve as a Web server.

2. Description of the Related Art

Recently, it is becoming popular that document data are transmitted via a network such as the Internet in such a way that the document data are divided into document structure data and document form data. Such division of document data makes it possible for a computer to process the document data more easily. In addition, if document data of a document are divided into document structure data and document form data, it is possible to show various layouts of the document without repetitive use of the whole document data by applying a plurality of document form data items.

For instance, XML (eXtensible Markup Language) and XSL (eXtensible Stylesheet Language) data are typically known as such document structure data and document form data, respectively, in the art. In general, when information is exhibited in form of a Web page in the Internet, a Web server generates and maintains XML data corresponding to the information. In response to receipt of a request for the information from a Web client, the Web server applies XSL data to the XML data for the purpose of XSLT (XSL Transformations) conversion. Through the XSLT conversion, the Web server converts the XML data into HTML (HyperText Markup Language) data and then sends the HTML data to the Web client.

On the other hand, image processing apparatuses that can serve as Web servers have been recently developed. Such an image processing apparatus makes it possible to convey through a widely used Web browser various data, for example, a current status of the image processing apparatus, information on stored documents, information on spooled jobs, and address information for fax transmission or e-mail transmission.

However, an XSL file accommodating such XSL data tends to have large data, because such an XSL file is created as a text file and contains many control codes such as linefeed codes, tab codes and indents to improve readability of the text file. Accordingly, it is quite difficult to maintain various XSL files in an image processing apparatus having a limited memory capacity such as ROM.

In order to overcome such a problem, a high-capacity hard disk may be provided to an image processing apparatus. In this case, however, it is impossible to prevent increasing fabrication cost of the image processing apparatus.

SUMMARY OF THE INVENTION

It is a general object of the present invention to provide an image processing apparatus in which one or more of the above-mentioned problems are eliminated.

A more specific object of the present invention is to provide an image processing apparatus that can create a Web page with a reasonable memory capacity for document form data.

In order to achieve the above-mentioned objects, there is provided according to one aspect of the present invention an image processing apparatus, including: a reception control part receiving a request for a Web page from a terminal connected to the image processing apparatus via a network; first storage means for storing a plurality of compressed document form information files; a decompression part decompressing at least one of the plurality of compressed document form information files in the first storage means into at least one document form data item; second storage means for storing the at least one document form data item; a Web page creation part using a document form data item in the second storage means to create the Web page; and a transmission control part sending the created Web page to the terminal.

According to one aspect of the present invention, since compressed document form information to create a Web page is stored in storage means, it is possible to create the Web page with a less memory capacity for storing the document form information.

In an embodiment of the present invention, the plurality of document form information files may be XSL files.

According to one aspect of the present invention, since a widespread XSL is used to define document form information, it is possible to develop a process for creating a Web page more efficiently.

In an embodiment of the present invention, the decompression part may decompress at least one of the plurality of compressed document form information files after the image processing apparatus is actuated and before the reception control part receives a first request for the Web page from the terminal.

According to one aspect of the present invention, since a document form information file is decompressed before receipt of a first request for a Web page from a terminal, it is possible to maintain an appropriate response speed for the request.

In an embodiment of the present invention, the decompression part may decompress at least one of the plurality of compressed document form information files after the image processing apparatus is actuated and when the reception control part receives a first request for the Web page from the terminal.

According to one aspect of the present invention, since a document form information file is decompressed in response to receipt of a first request for a Web page, it is possible to save a memory capacity of storage means for storing the decompressed document form data. In addition, it is possible to maintain an appropriate response speed for the request.

In an embodiment of the present invention, the decompression part may decompress all of the plurality of compressed document form information files in the first storage means.

According to one aspect of the present invention, since all document form information files are decompressed in advance, it is possible to always find a document form data item to create a requested Web page in storage means. As a result, it is possible to maintain an appropriate response speed for the request.

In an embodiment of the present invention, the decompression part, when the reception control part receives the request for the Web page from the terminal, may decompress a document form information file corresponding to a document form data item to create the Web page.

According to one aspect of the present invention, in response to receipt of a request for a Web page from a terminal, a compressed document form information file is decompressed corresponding to a document form data item to create the Web page. As a result, it is possible to save a memory capacity of storage means for storing the document form data item.

In an embodiment of the present invention, the decompression part, after the image processing apparatus is actuated and before or when the reception control part receives a first request for the Web page from the terminal, may decompress a predetermined number of the plurality of compressed document form information files in most recently accessed order.

According to one aspect of the present invention, since a predetermined number of the plurality of compressed document form information files are decompressed in most recently accessed order, it is possible to save a memory capacity of storage means for storing a document form data item. In addition, it is possible to maintain an appropriate response speed for a request for a recently requested Web page.

In an embodiment of the present invention, the decompression part, after the image processing apparatus is actuated and before or when the communication control part receives a first request for the Web page from the terminal, may-decompress a predetermined number of the plurality of document form information files in most frequently accessed order.

According to one aspect of the present invention, since a predetermined number of the plurality of compressed document form information files are decompressed in descending order of access frequency, it is possible to save a memory capacity of storage means for storing a document form data item. In addition, it is possible to maintain an appropriate response speed for a request for a frequently requested Web page.

In an embodiment of the present invention, the Web page creation part may delete the document form data item from the second storage means after creation of the Web page.

According to one aspect of the present invention, since a document form data item is deleted from storage means after creation of a Web page, it is possible to save a memory capacity of the storage means.

In an embodiment of the present invention, the Web page creation part may include a decompression determination part determining whether or not the document form data item is stored in the second storage means, and the Web page creation part may use the document form data item to create the Web page based on determination of the decompression determination part.

According to one aspect of the present invention, if a document form information file to create a requested Web page has been decompressed, the document form data item corresponding to the document form information file can be used to create the Web page. As a result, it is possible to maintain an appropriate response speed for the request.

In an embodiment of the present invention, the Web page creation part, when the number of the document form data items exceeds a predetermined value, may delete one of the at least one document form data item in the second storage means from the second storage means.

According to one aspect of the present invention, if the number of the document form data items exceeds a predetermined value, one of document form data items in storage means is deleted. As a result, it is possible to save a memory capacity of the storage means.

In an embodiment of the present invention, the Web page creation part may delete the least recently used document form data item in the second storage means from the second storage means.

According to one aspect of the present invention, since the least recently used document form data item in storage means is deleted, it is possible to maintain an appropriate response speed for a Web page request that is necessary to use the most recently decompressed document form information file.

In an embodiment of the present invention, the Web page creation part may delete the earliest stored document form data item in the second storage means from the second storage means.

According to one aspect of the present invention, since the earliest stored document form data item in storage means is deleted, it is possible to maintain an appropriate response speed for a Web page request that is necessary to use the most recently decompressed document form information file.

Additionally, there is provided according to another aspect of the present invention a method of creating a Web page for an image processing apparatus that receives a request for the Web page from a terminal connected to the image processing apparatus via a network and sends the created Web page to the terminal, the method including: a decompression step of decompressing at least one compressed document form information file in the image processing apparatus into at least one document form data item; and a Web page creation step of using a document form data item in the image processing apparatus to create the Web page.

Additionally, there is provided according to another aspect of the present invention an image processing system, including: a terminal being connected to a network, the terminal including a display part displaying information; an image processing apparatus being connected to the terminal via the network, the image processing apparatus including: a reception control part receiving a request for a Web page from the terminal; first storage means for storing a plurality of compressed document form information files; a decompression part decompressing at least one of the plurality of compressed document form information files in the first storage means into at least one document form data item; second storage means for storing the at least one document form data item; a Web page creation part using a document form data item in the second storage means to create the Web page; and a transmission control part sending the Web page to the terminal, wherein the display part of the terminal, in response to receipt of the created Web page from the image processing apparatus, displays the Web page.

Additionally, there is provided according to another aspect of the present invention an information processing apparatus, including: a reception control part receiving a request for a Web page from a terminal connected to the information processing apparatus via a network; first storage means for storing a plurality of compressed document form information files; a decompression part decompressing at least one of the plurality of compressed document form information files in the first storage means into at least one document form data item; second storage means for storing the at least one document form data item; a Web page creation part using a document form data item in the second storage means to create the Web page; and a transmission control part sending the created Web page to the terminal.

Additionally, there is provided according to another aspect of the present invention an information processing system, including: a terminal being connected to a network, the terminal including a display part displaying information; an information processing apparatus being connected to the terminal via the network, the information processing apparatus including: a reception control part receiving a request for a Web page from the terminal; first storage means for storing a plurality of compressed document form information files; a decompression part decompressing at least one of the plurality of compressed document form information files in the first storage means into at least one document form data item; second storage means for storing the at least one document form data item; a Web page creation part using a document form data item in the second storage means to create the Web page; and a transmission control part sending the created Web page to the terminal, wherein the display part of the terminal, in response to receipt of the created Web page from the information processing apparatus, displays the Web page.

According to one aspect of the present invention, it is possible to provide a method of creating a Web page for the above-mentioned inventive image processing apparatus and an image processing system having the inventive image processing apparatus. Additionally, the present invention is applicable to a more general information processing apparatus.

Other objects, features and advantages of the present invention will become more apparent from the following detailed description when read in conjunction with the accompanying drawings.

BRIEF DESCRIPTION OF THE DRAWINGS

FIG. 10 is a diagram illustrating an exemplary compressed XSL file correspondence table according to the third embodiment;

DETAILED DESCRIPTION OF THE PREFERRED EMBODIMENTS

In the following, embodiments of the present invention will be described with reference to the accompanying drawings.

Figure 1:
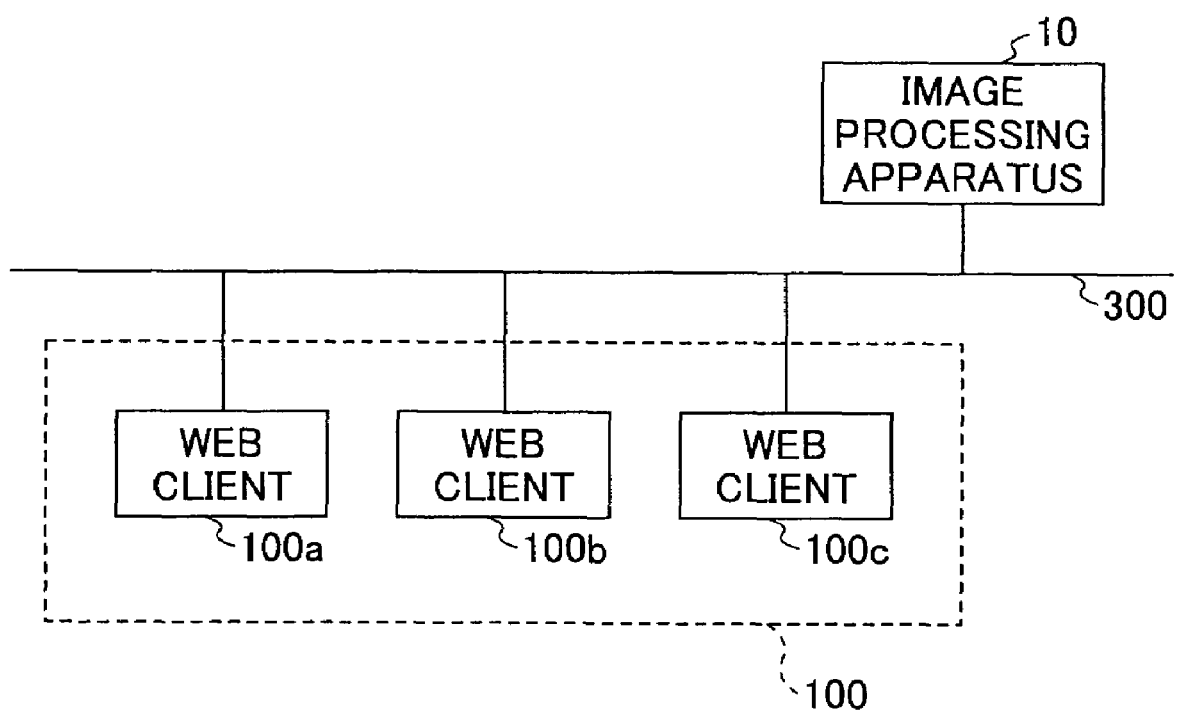
FIG. 1 is a block diagram illustrating an exemplary structure of an image processing system according to an embodiment of the present invention.

FIG. 1 shows an exemplary structure of an image processing system according to an embodiment of the present invention. Referring to FIG. 1, an image processing system 1 comprises an image processing apparatus 10 and Web clients 100a through 100c (hereinafter which are collectively referred to as a Web client 100). The image processing apparatus 10 and the Web client 100 are connected to each other via a network 300 such as LAN (Local Area Network), an intranet and the Internet.

In response to various requests from the Web client 100, the image processing apparatus 10 performs processes corresponding to the requests on document data such as printing and fax transmission of document data. For instance, when the image processing apparatus 10 receives an HTTP request from the Web client 100, the image processing apparatus 10 sends a Web page for displaying information requested through the HTTP request to the Web client 100. Specifically, when a user of the Web client 100 requests status information of the image processing apparatus 10 from a Web browser, the image processing apparatus sends HTML (HyperText Markup Language) data including the requested status information to the Web client 100.

The Web client 100 can be embodied as a terminal directly operated by a user of the image processing system 1, for example, a PC (Personal Computer), a PDA (Personal Digital (Data) Assistant), and a cellular phone. The Web client 100 includes a Web browser that can display a Web page sent by the image processing apparatus 10.

Figure 2:
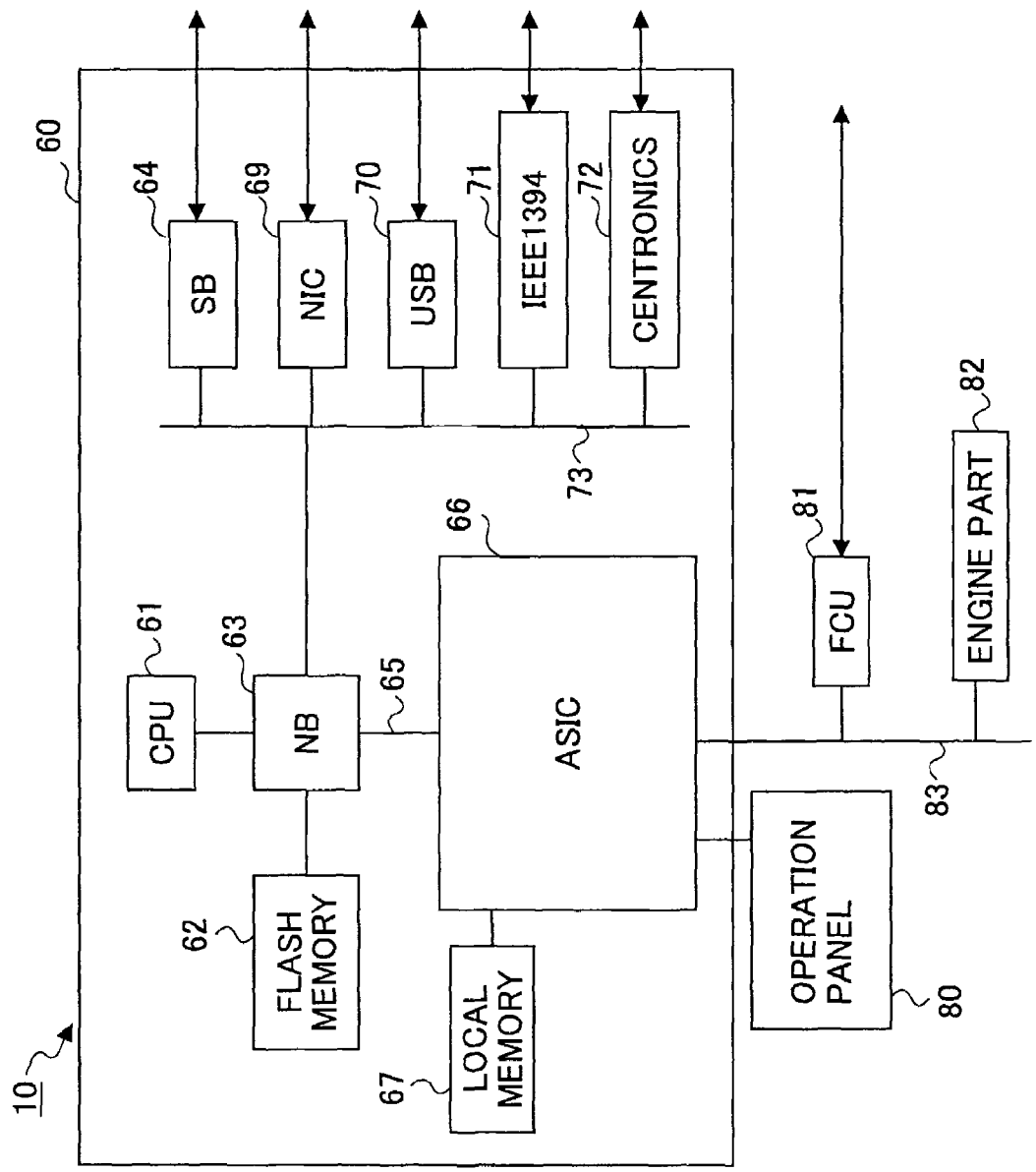
FIG. 2 is a block diagram illustrating an exemplary hardware configuration of a multifunctional machine according to an embodiment of the present invention.

FIG. 2 is a block diagram illustrating an exemplary hardware configuration of the image processing apparatus 10. Referring to FIG. 2, the image processing apparatus 10 comprises a controller 60, an operation panel 80, a FCU (Fax Control Unit) 81, and an engine part 82.

The controller 60 comprises a CPU (Central Processing Unit) 61, a flash memory 62, a north bridge (NB) 63, a south bridge (SB) 64, an ASIC (Application Specific Integrated Circuit) 66, a local memory 67, a network interface card (NIC) 69, a USB (Universal Serial Bus) device 70, an IEEE1394 device 71, and a centronics 72.

The operation panel 80 is connected to ASIC 66 of the controller 60. In addition, FCU 81 and the engine part 82 are connected to ASIC 66 via a PCI (Peripheral Component Interconnect) bus 83.

In the controller 60, the local memory 67 is connected to ASIC 66, and CPU 61 is connected to ASIC 66 via NB 63. In this configuration, the controller 60 can correspond to a case where an interface of CPU 61 is not disclosed. Here, ASIC 66 is connected to NB 63 via AGP (Accelerated Graphics Port) 65.

In order to control execution of applications in the image processing apparatus 10, ASIC 66 is connected to NB 63 via AGP 65 rather than a low-speed PCI bus. As a result, it is possible to prevent performance degradation of the image processing apparatus 10.

CPU 61 not only exercises overall control over the image processing apparatus 10 but also executes various applications installed in the image processing apparatus 10.

NB 63 is a bridge to connect among CPU 61, the flash memory 62, SB 64, ASIC 66, NIC 69, the USB device 70, the IEEE1394 device 71 and the centronics 72.

SB 64, NIC 69, the USB device 70, the IEEE1394 device 71 and the centronics 72 are connected to each other via NB 63. Here, SB 64 is a bridge to connect the PCI bus 73 to ROM or peripheral devices.

The flash memory 62 maintains applications executed by the image processing apparatus 10 and various files processed by the applications. The local memory 67 is used as a working memory in which the applications and the files are loaded when the applications and the files are executed.

ASIC 66, which has a hardware component for image processing, is an IC (Integrated Circuit) dedicated to process an image.

NIC 69 serves as an interface to connect the between the image processing apparatus 10 and a network. The USB device 70, the IEEE1394 device 71 and the centronics 72 are interfaces in compliance with respective standards, as appreciated by those skilled in the art.

The operation panel 80 serves as an operation part to accept an input provided by an operator and display messages or data to the operator.

It is noted that FCU 81 includes a backup memory. When the image processing apparatus 10 is OFF, received fax data are temporarily stored in the backup memory of FCU 81.

Figure 3:
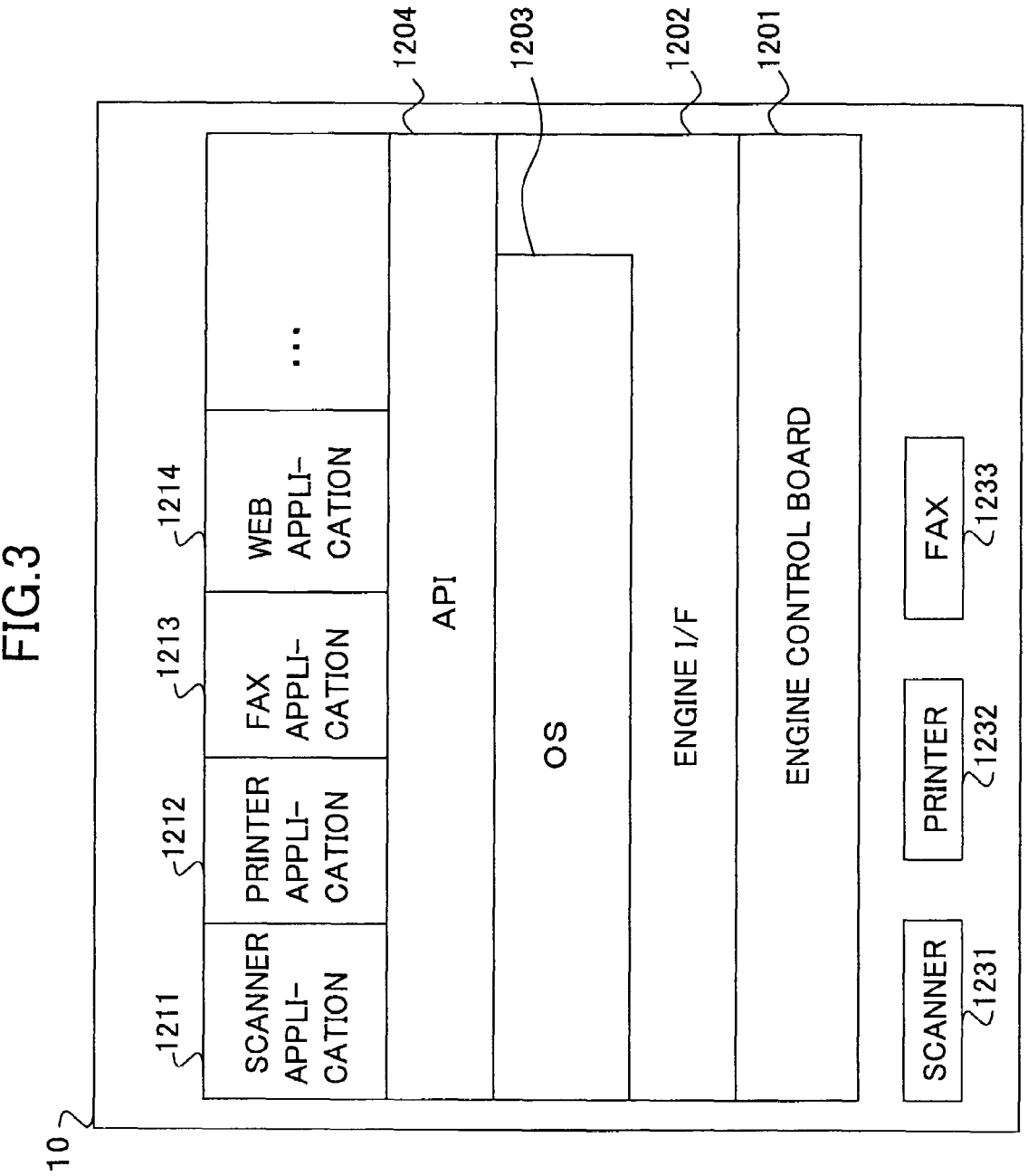
FIG. 3 is a diagram illustrating an exemplary functional structure of an image processing apparatus according to an embodiment of the present invention.

FIG. 3 shows an exemplary functional structure of the image processing apparatus 10. Referring to FIG. 3, the image processing apparatus 10 comprises a scanner 1231, a printer 1232, a facsimile 1233, an engine control board 1201, an engine I/F 1202, an operating system (OS) 1203, API (Application Program Interface) 1204, a scanner application 1211, a printer application 1212, a fax application 1213 and a Web application 1214.

The engine control board 1201 controls the scanner 1231, the printer 1232 and the facsimile 1233. The engine I/F 1202 provides an interface between the engine control board 1201 and the operating system 1203 and API 1204.

The operating system 1203 is an operating system such as UNIX (Registered Trademark). The operating system 1203 executes some software items to implement applications such as the scanner application 1211 and the printer application 1212 in parallel.

API 1204 serves as an interface to applications such as the scanner application 1211 and the printer application 1212.

The scanner application 1211 offers an application for the scanner 1231. The printer application 1212 offers an application for the printer 1232, and includes PDL (Page Descriptive Language), PCL (Printer Control Language) and PS (PostScript). The fax application 1213 offers an application for the facsimile 1233. The Web application 1214 offers various functions of the image processing apparatus 10 to the Web client 100 connected to the image processing apparatus via a network.

As mentioned above, since applications are mounted on the operating system 1203 and API 1204, the applications can share individual image processing parts. Accordingly, it is possible to enhance total productivity of the image processing apparatus 10 and development efficiency of the individual applications.

Figure 4:
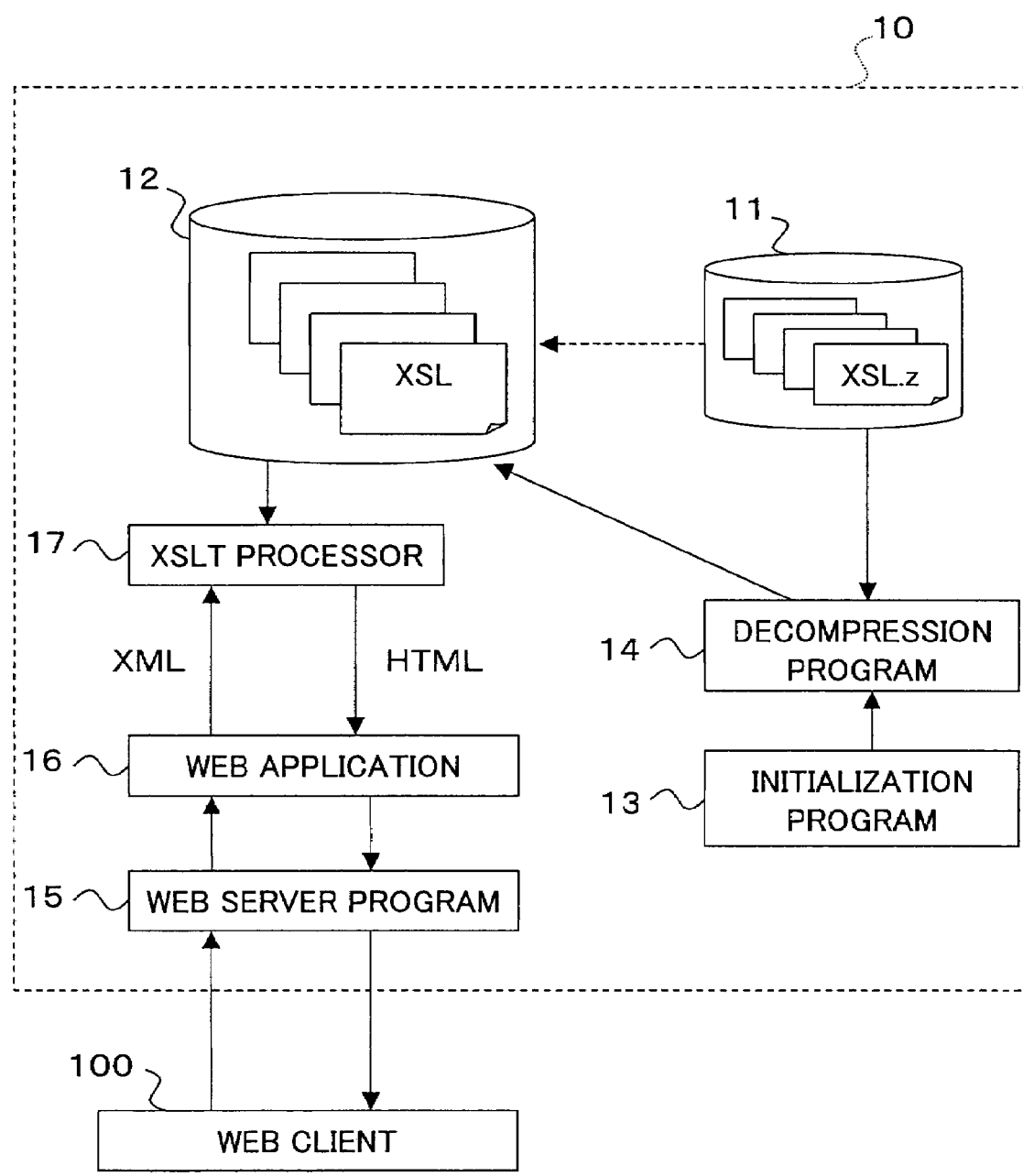
FIG. 4 is a block diagram illustrating an exemplary functional structure of an image processing apparatus according to a first embodiment of the present invention.
Figure 5:
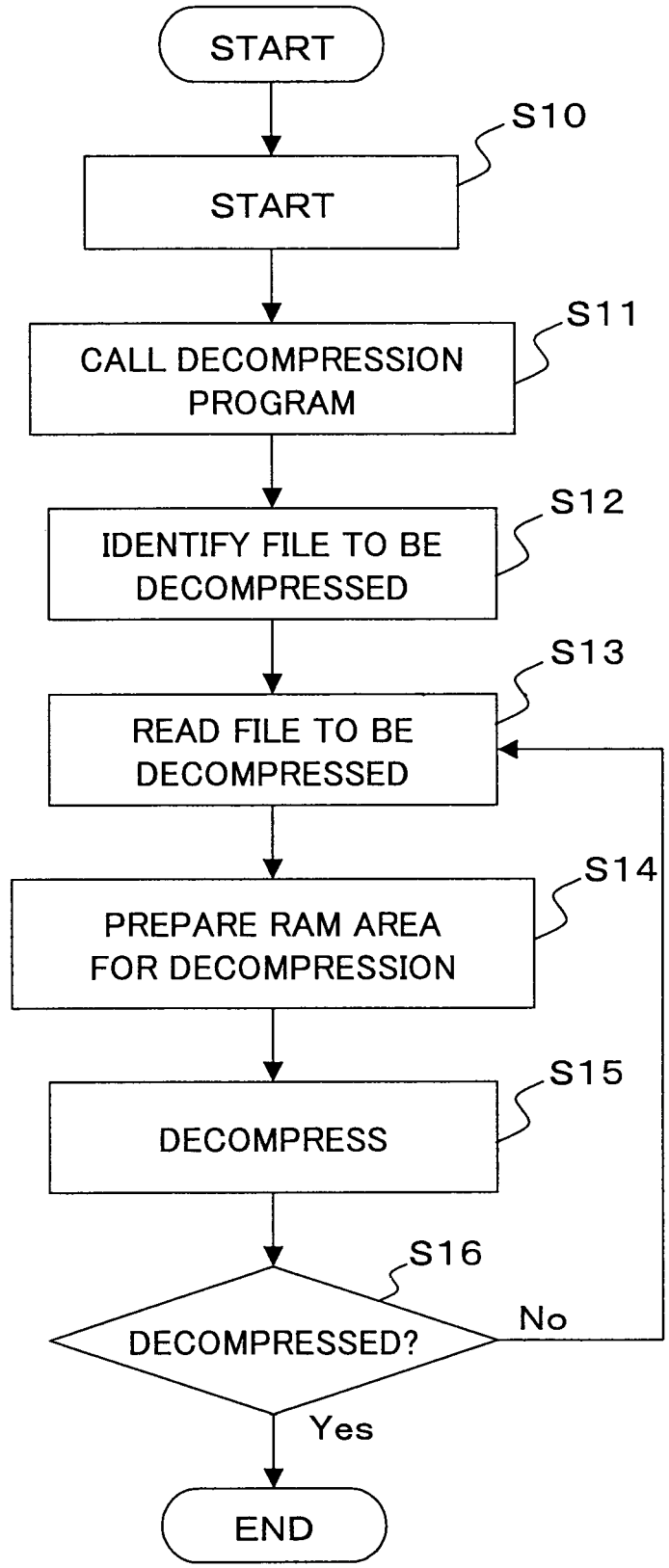
FIG. 5 is a flowchart of a process for decompressing an XSL file in the image processing apparatus according to the first embodiment.

A description is given, with reference to FIG. 4 and FIG. 5, of an image processing apparatus according to a first embodiment of the present invention.

FIG. 4 shows an exemplary functional structure of an image processing apparatus, which serves as a Web server, according to the first embodiment. Referring to FIG. 4, the image processing apparatus 10 comprises ROM (Read Only Memory) 11, RAM (Random Access Memory) 12, an initialization program 13, a decompression program 14, a Web server program 15, a Web application 16 and an XSLT (extensible Stylesheet Language Transformations) processor 17.

ROM 11 is a memory for storing a compressed XSL file and the like. RAM 12 is a memory for storing decompressed XSL data decompressed by a decompression program 14 and the like. ROM 11 and RAM 12 correspond to the flash memory 62 and the local memory 67 in FIG. 2, respectively. The initialization program 13 is called when the image processing apparatus 10 is actuated. Then, the initialization program 13 calls the decompression program 14. The decompression program 14 decompresses a compressed XSL file in ROM 11 and stores the decompressed XSL data in RAM 12. Here, the decompression program 14 does not have to be called by the initialization program 13 as soon as the image processing apparatus 10 starts. It is sufficient that the decompression program 14 is called before the Web server program 15 receives a first Web page transmission request, that is, a first HTTP request, from the Web client 100. For this reason, alternatively, the Web server program 15 rather than the initialization program 13 may call the decompression program 14 when the Web server program 15 is activated.

The Web server program 15, which corresponds to a so-called HTTPd (HTTP daemon), plays a significant role when the image processing apparatus 10 is used as a Web server. In response to receipt of an HTTP request from the Web client 100, the Web server program 15 drives the Web application 16. The Web server program 15 sends HTML data created by the Web application 16 to the Web client 100 that has requested the HTML data. Here, the Web server program 15 is installed in the image processing apparatus 10 as a function of API 1204.

The XSLT processor 17 is called by the Web application 16. At this time, the XSLT processor 17 uses XSL data in RAM 12 to convert designated XML data into HTML data.

FIG. 5 is a flowchart of a process for decompressing a compressed XSL file in the image processing apparatus 10 according to the first embodiment. Referring to FIG. 5, when the image processing apparatus 10 is activated, the image processing apparatus 10 calls the initialization program 13 at step S10. The process control of the currently described decompression process moves to step S11.

At step S11, the initialization program 13 calls the decompression program 14. The process control moves to step S12.

At step S12, the decompression program 14 examines all file names of compressed XSL files to be decompressed. For instance, the file names are managed in such a way that a file name list of all the compressed XSL files is stored in a predetermined file. In this case, the decompression program 14 can examine all the file names of the compressed XSL files with reference to the predetermined file (hereinafter which is referred to as a compressed XSL list file). The process control moves to step S13.

At step S13, the decompression program 14 reads one of the compressed XSL files to be decompressed from ROM 11, and the process control moves to step S14.

At step S14, the decompression program 14 prepares an area in RAM 12 in which the decompressed XSL data should be stored, and the process control moves to step S15.

At step S15, the decompression program 14 decompresses the read compressed XSL file and stores the decompressed XSL data in the prepared area in RAM 12. The process control moves to step S16.

At step S16, the decompression program 14 determines whether or not all compressed XSL files, which should be decompressed, have been decompressed. If ROM 11 contains any compressed XSL file that has not been decompressed yet, the process control returns to step S13 so as to continue the decompression process. On the other hand, if all the compressed XSL files in ROM 11 have been already decompressed, the decompression process is terminated.

After completion of the decompression process, if the image processing apparatus 10 receives an HTTP request from the Web client 100, the XSLT processor 17 can use an XSL data item in RAM 12 corresponding to the HTTP request to convert XML data created by the Web application 16 into HTML data.

According to the above-mentioned image processing apparatus 10, since compressed XSL files are stored in ROM 11, it is possible to save memory capacity of ROM 11. In addition, before a first HTTP request is sent from the Web client 100, the compressed XSL files are decompressed. As a result, it is possible to maintain an appropriate response speed to an HTTP request from the Web client 100.

In the above-mentioned image processing apparatus 10, if RAM 12 has an insufficient memory capacity, all file names of compressed XSL files do not have to be registered in a compressed XSL list file. Some of the file names of compressed XSL files may be registered in the compressed XSL list file. In this case, when the image processing apparatus 10 receives an HTTP request from the Web client 100, there is a probability that RAM 12 does not contain an XSL data item corresponding to the requested Web page. If the corresponding XSL data item is not stored in RAM 12, the compressed XSL file corresponding to the requested Web page is decompressed in response to the receipt of the HTTP request. A decompression process for a compressed XSL file corresponding to a requested Web page is described in an image processing apparatus according to a third embodiment of the present invention. Also, a method of determining whether a compressed XSL file corresponding to a requested Web page has been decompressed is described in an image processing apparatus according to a fourth embodiment of the present invention.

Here, if XSL data items are decompressed in most frequently accessed order or most recently accessed order, it is possible to decrease the probability that XSL data corresponding to a requested Web page is not in RAM 12. In order to select the most frequently used XSL data items, the number of references that have made to each compressed XSL file in the compressed XSL list file is counted, and the reference counter is provided to the image processing apparatus 10. Whenever the XSLT, processor 17 uses an XSL data item, the reference counter of the XSL data item is incremented. On the other hand, in order to select the most recently used XSL data items, a reference time of each compressed XSL file is recorded in the compressed XSL list file. Whenever the XSLT processor 17 uses an XSL data item, the reference time is updated. In these embodiments, the decompression program 14 can determine the most frequently used compressed XSL files or the most recently used compressed XSL files with reference to such a reference counter or a reference time.

Figure 6:
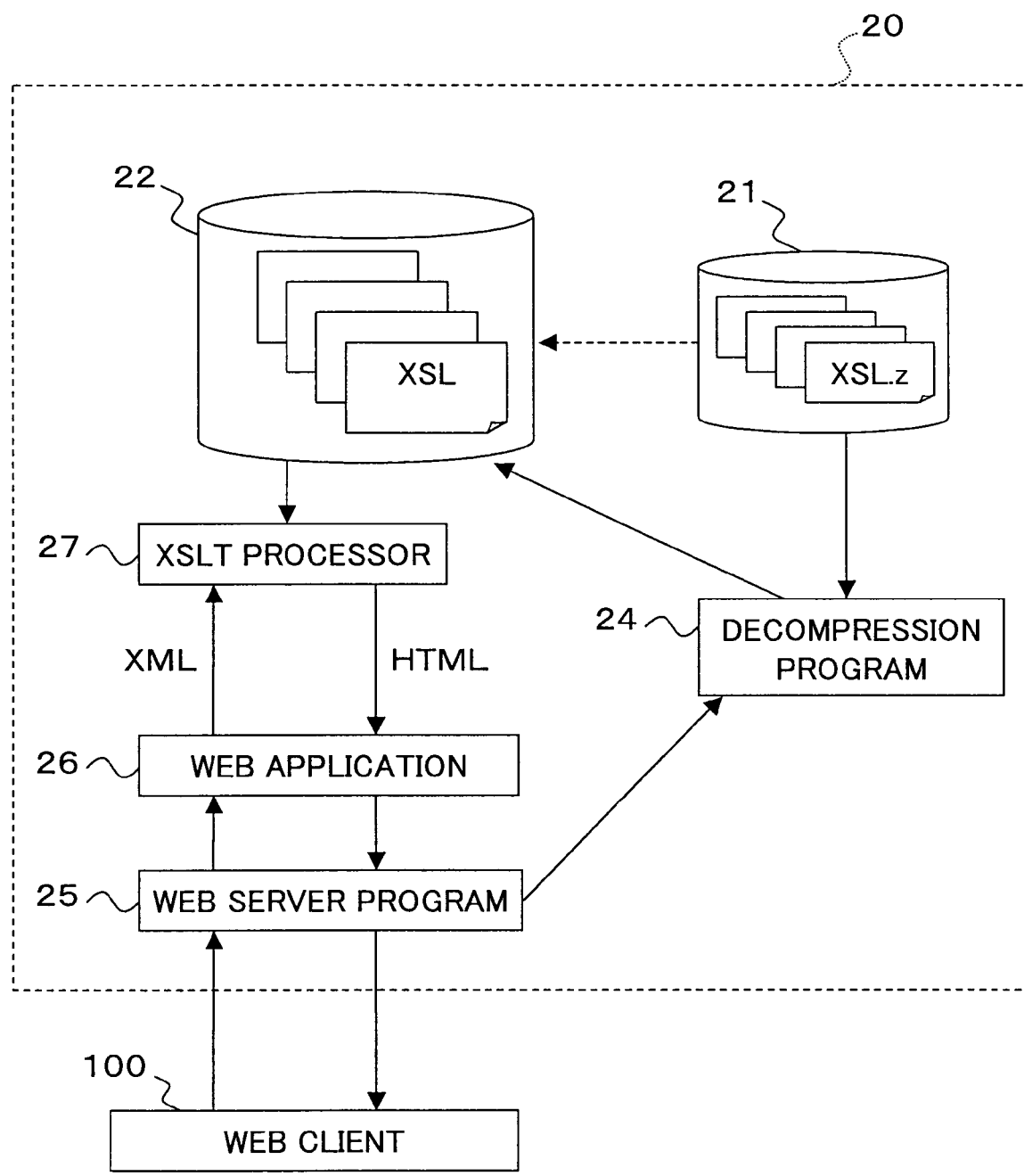
FIG. 6 is a block diagram illustrating an exemplary functional structure of an image processing apparatus according to a second embodiment of the present invention.
Figure 7:
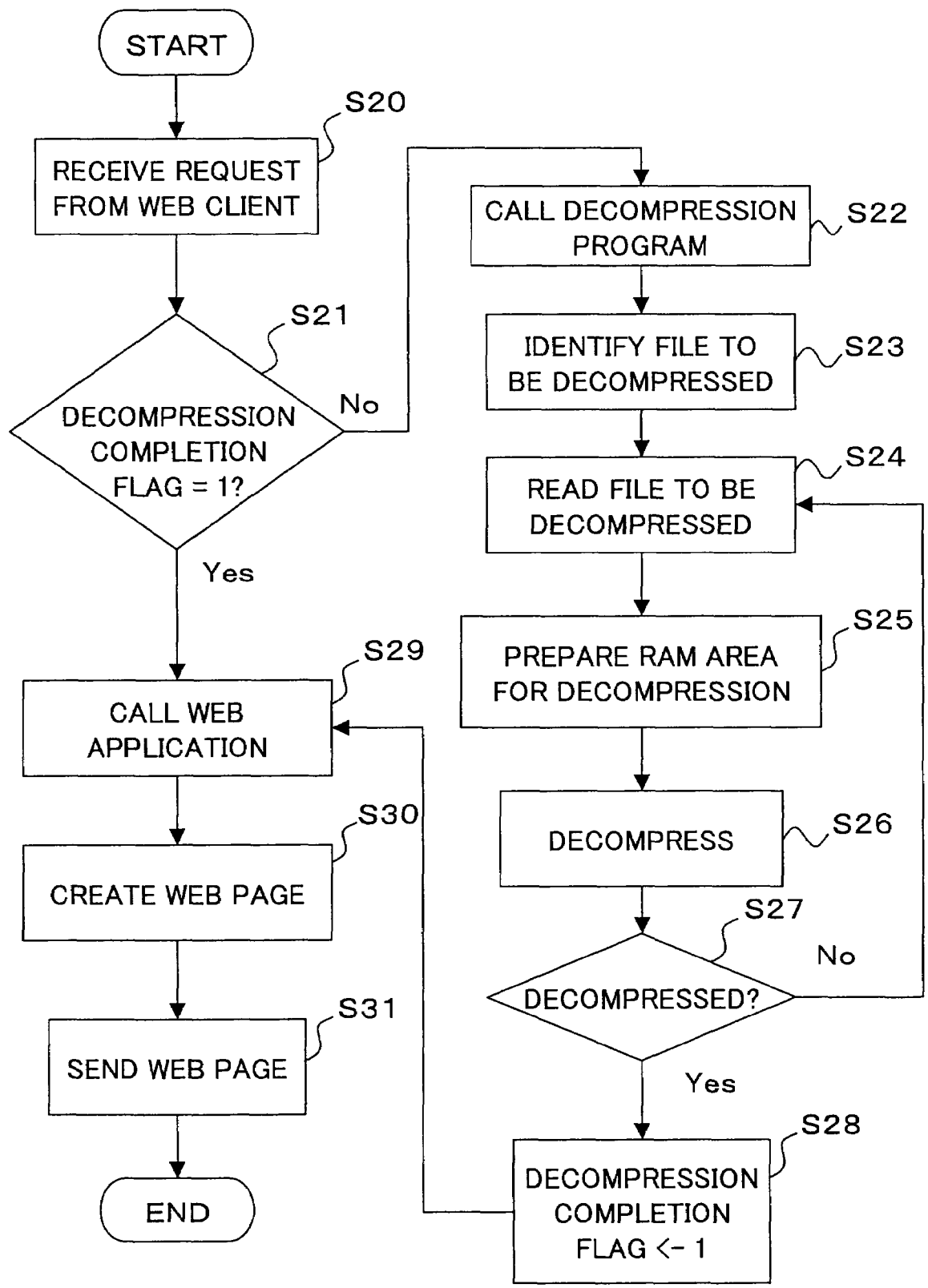
FIG. 7 is a flowchart of a process for decompressing an XSL file in the image processing apparatus according to the second embodiment.

A description is given, with reference to FIG. 6 and FIG. 7, of an image processing apparatus according to a second embodiment of the present invention. FIG. 6 is a block diagram illustrating an exemplary functional structure of an image processing apparatus 20 according to the second embodiment.

Referring to FIG. 6, the image processing apparatus 20 comprises ROM 21, RAM 22, a decompression program 24, a Web server program 25, a Web application 26, and an XSLT processor 27. These components correspond to those of the image processing apparatus 10 according to the first embodiment. As seen from the configuration, the image processing apparatus 20 has the fundamentally same structure as the image processing apparatus 10. However, the image processing apparatus differs from the image processing apparatus 10 in that the image processing apparatus 20 does not have a component corresponding to the initialization program 11 and the Web server program 25 is responsible to call the decompression program 24.

FIG. 7 is a flowchart of a process for decompressing a compressed XSL file in the image processing apparatus 20.

Referring to FIG. 7, when the Web server program 25 receives an HTTP request from the Web client 100 at step S20, the Web server program 25 determines whether or not a value of a decompression completion flag is equal to 1 at step S21. Based on the determination, it can be determined whether all compressed XSL files have been decompressed.

If the value of the decompression completion flag is equal to 1, that is, if all the compressed XSL files have been decompressed, the process control of the image processing apparatus 20 moves to step S28. On the other hand, if the value of the decompression completion flag is not equal to 1, that is, if there is a compressed XSL file that has not been decompressed yet, the process control moves to step S22.

At step S22, the Web server program 25 calls the decompression program 24, and the process control moves to step S23.

At steps S23 through S27, the decompression program 24 decompresses all the compressed XSL files in ROM 21 and stores decompressed XSL data items in RAM 22 as in steps S12 through S16 of the image processing apparatus 10 according to the first embodiment. After the decompression program 24 decompresses all the compressed XSL files, the process control moves to step S28.

At step S28, the Web server program 25 sets the decompression completion flag as 1, and the process control moves to step S29.

At step S29, when the Web server program 25 calls a component of the Web application 26 corresponding to the HTTP request from the Web client 100, the Web application 26 performs a predetermined process and creates XML data. The process control moves to step S30.

At step S30, the Web application 26 calls the XSLT processor 27 and uses the XSLT processor 27 to convert the XML data into HTML data. The HTML data are supplied to the Web server program 25. Here, the XSLT processor 27 uses XSL data in RAM 22 to convert the XML data into the HTML data. The process control moves to step S31.

At step S31, the Web server program 25 sends a Web page, which is created as the HTML data, to the Web client 100. Then, the decompression process is terminated.

According to the above-mentioned image processing apparatus 20, since a compressed XSL file is stored in ROM 21, it is possible to save a memory capacity of ROM 21. In addition, in response to receipt of an HTTP request from the Web client 100, if the value of the decompression completion flag is equal to 1, the image processing apparatus 20 performs the above-mentioned decompression process. Here, once the decompression process is performed, the decompression completion flag is set as 1. Hence, when the image processing apparatus 20 starts and receives a first HTTP request from the Web client 100, a compressed XSL file is decompressed. Accordingly, before the image processing apparatus 20 receives the first HTTP request from the Web client 100, the image processing apparatus 20 can operate with little use of the memory capacity of RAM 22. Furthermore, it is possible to maintain an appropriate response speed to an HTTP request from the Web client 100.

It is noted that all compressed XSL files in ROM 21 do not have to be decompressed as described in the first embodiment. In other words, some of the compressed XSL files, which are selected in accordance with the above-mentioned selection criteria, may be decompressed.

Figure 8:
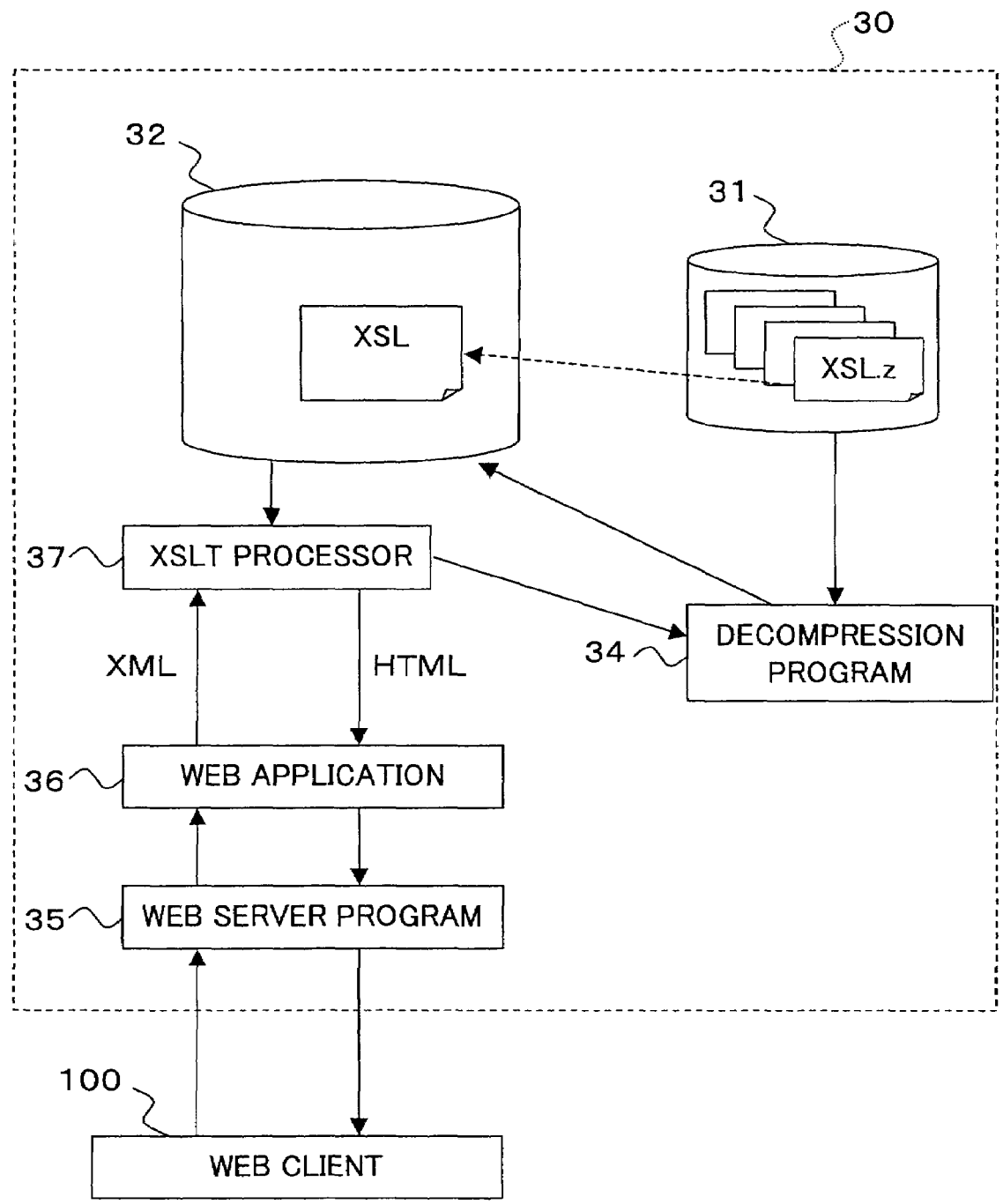
FIG. 8 is a block diagram illustrating an exemplary functional structure of an image processing apparatus according to a third embodiment of the present invention.
Figure 9:
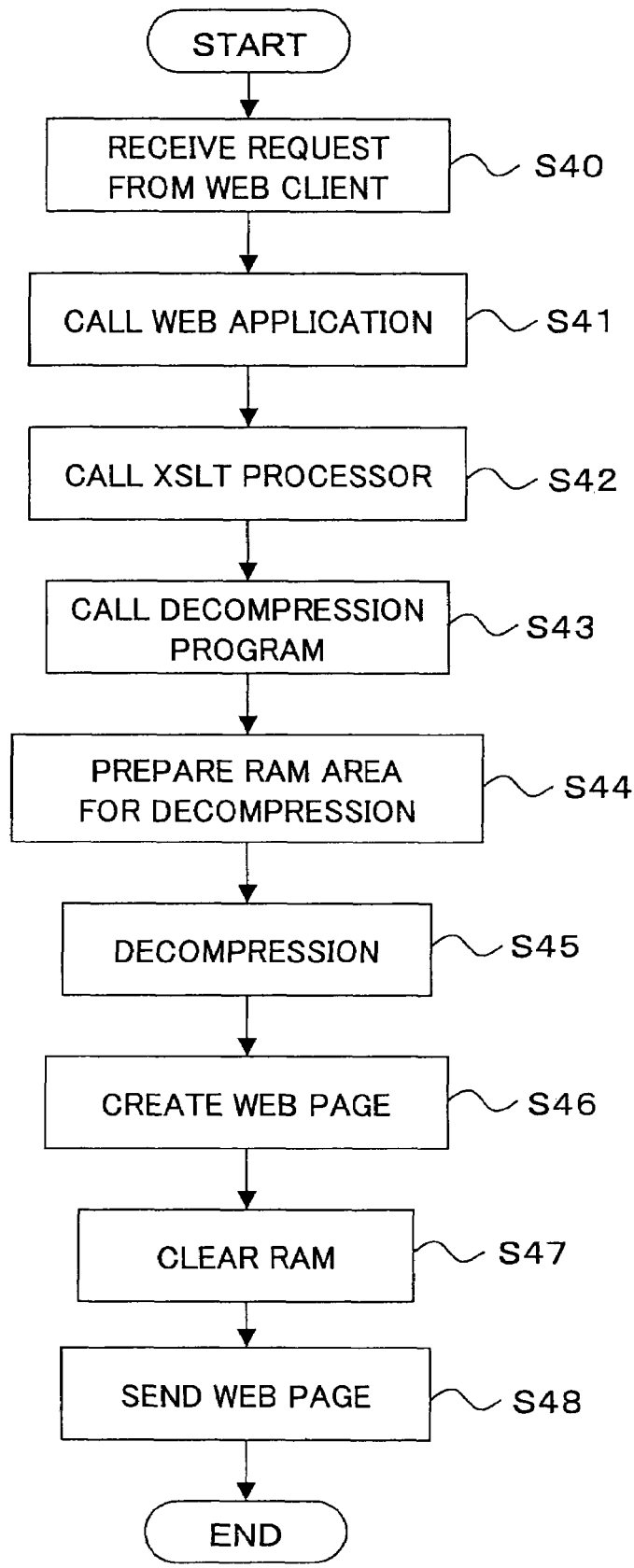
FIG. 9 is a flowchart of a process for decompressing an XSL file in the image processing apparatus according to the third embodiment.

A description is given, with reference to FIG. 8 through FIG. 10, of an image processing apparatus according to a third embodiment of the present invention. FIG. 8 is a block diagram illustrating an exemplary functional structure of an image processing apparatus 30 according to the third embodiment.

Referring to FIG. 8, the image processing apparatus 30 has the same structure as the image processing apparatus 20. Namely, the image processing apparatus comprises ROM 31, RAM 32, a decompression program 34, a Web server program 35, a Web application 36 and an XSLT processor 37. These components correspond to those of the image processing-apparatus 20. However, the XSLT processor 37 is responsible to call the decompression program 34 in the image processing apparatus 30.

FIG. 9 is a flowchart of a process for decompressing a compressed XSL file in the image processing apparatus 30 according to the third embodiment.

Referring to FIG. 9, when the Web server program 35 receives an HTTP request from the Web client 100 at step S40, the process control of the image processing apparatus 30 moves to step S41.

At step S41, when the Web server program 35 calls the Web application 36 corresponding to the HTTP request, the Web application 36 performs a predetermined process to create XML data. The process control moves to step S42.

At step S42, the Web application 36 designates an XSL file corresponding to the XML data and calls the XSLT processor 37 in order to convert the XML data into HTML data. In another embodiment, the XSL file may be incorporated in the image processing apparatus as a logic of the Web application 36. Alternatively, the Web application 36 may determines the XSL file corresponding to the XML data with reference to an XSL file correspondence table as illustrated in FIG. 10.

FIG. 10 shows an exemplary XSL file correspondence table 361. Referring to FIG. 10, the XSL file correspondence table 361 comprises a data item "URL" and a data item "XSL". In the data item "URL", URLs requested by the Web client 100 are accommodated. In the data item "XSL", file names of compressed XSL files used for the requested URLs are accommodated. For instance, if the URL "topPage.cgi" is designated, the Web application 36 determines that the compressed XSL file "topPage.xsl.z" should be used with reference to the XSL file correspondence table 361. Then, the Web application 36 designates the file name and calls the XSLT processor 37. The process control moves to step S43.

At step S43, the XSLT processor 37 designates the compressed XSL file and calls the decompression program 34 in order to obtain XSL data required for XSLT conversion. The process control moves to step S44.

At steps S44 and S45, the decompression program 34 decompresses the designated compressed XSL file in ROM 31 and stores the decompressed XSL data in RAM 32 as in steps S24 and S25 of the decompression process of the image processing apparatus 20. The process control moves to step S46.

At step S46, the XSLT processor 37 uses the XSL data in RAM 32 to convert the XML data into HTML data to form a Web page. The process control moves to step S47.

At step S47, the XSLT processor 37 releases an area in RAM 32 in which the decompressed XSL data are stored so as to delete the XML data from RAM 32. The process control moves to step S48.

At step S48, the Web server program 35 sends the created Web page to the Web client 100, and then the decompression process according to the third embodiment is terminated.

According to the above-mentioned image processing apparatus 30, since a compressed XSL file is stored in ROM 31, it is possible to save a memory capacity of ROM 31. In addition, when the image processing apparatus 30 receives an HTTP request from the Web client 100, the image processing apparatus 30 decompresses a compressed XSL file required to form a Web page and stores the decompressed XSL data in RAM 32. After completing of creation of the Web page, the image processing apparatus 30 releases an area in RAM 32 for storing the XSL data. As a result, it is possible to prevent wasteful use of a memory area of RAM 32.

Figure 11:
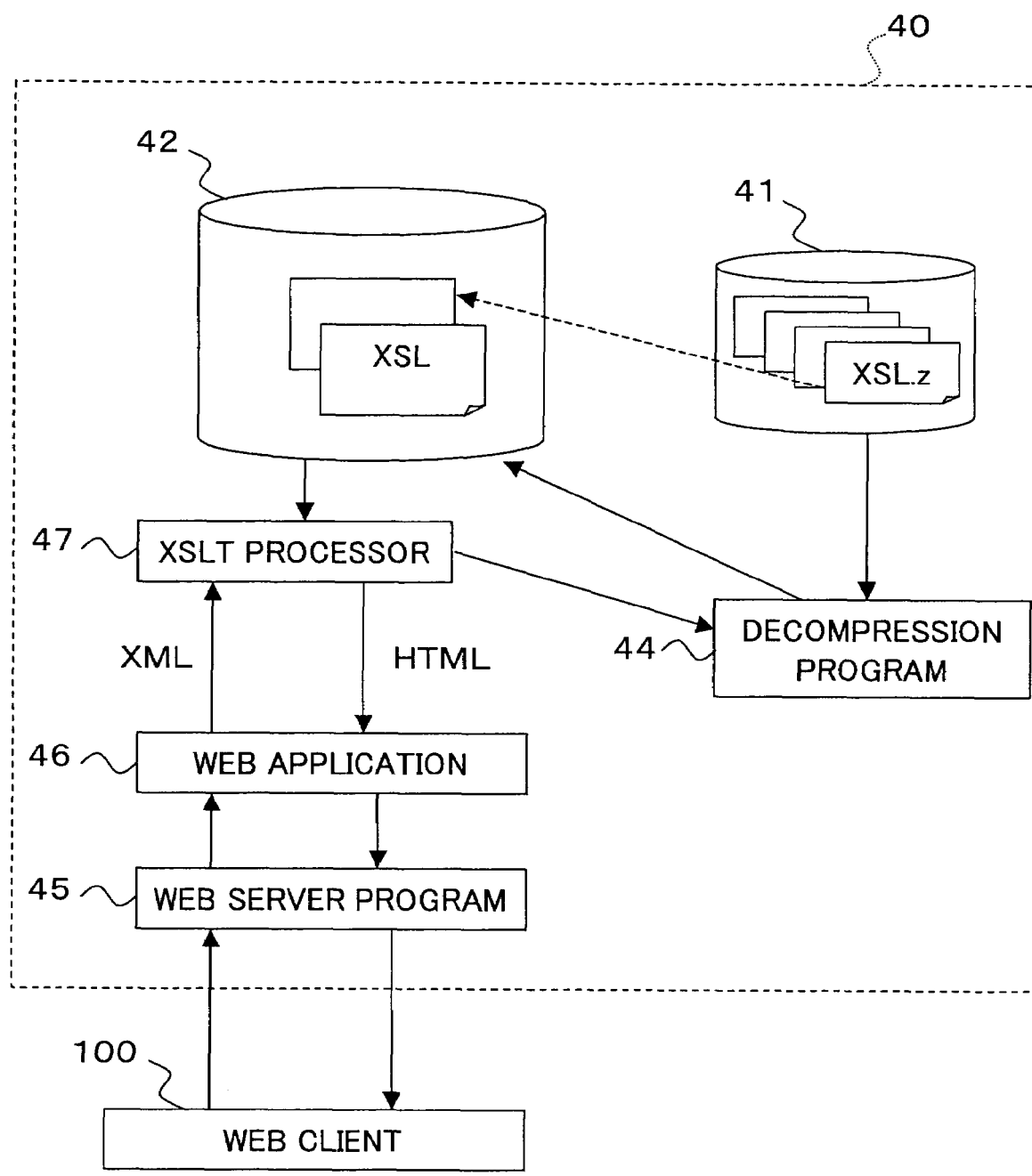
FIG. 11 is a block diagram illustrating an exemplary functional structure of an image processing apparatus according to a fourth embodiment of the present invention.

A description is given, with reference to FIG. 11 through FIG. 15, of an image processing apparatus according to a fourth embodiment of the present invention. FIG. 11 is a block diagram illustrating an exemplary structure of an image processing apparatus 40 according to the fourth embodiment.

Referring to FIG. 11, the image processing apparatus 40 has the same structure as the image processing apparatuses 20 and 30. Specifically, the image processing apparatus 40 comprises ROM 41, RAM 42, a decompression program 44, a Web server program 45, a Web application 46 and an XSLT processor 47. These components correspond to those of the image processing apparatuses 20 and 30.

Figure 12:
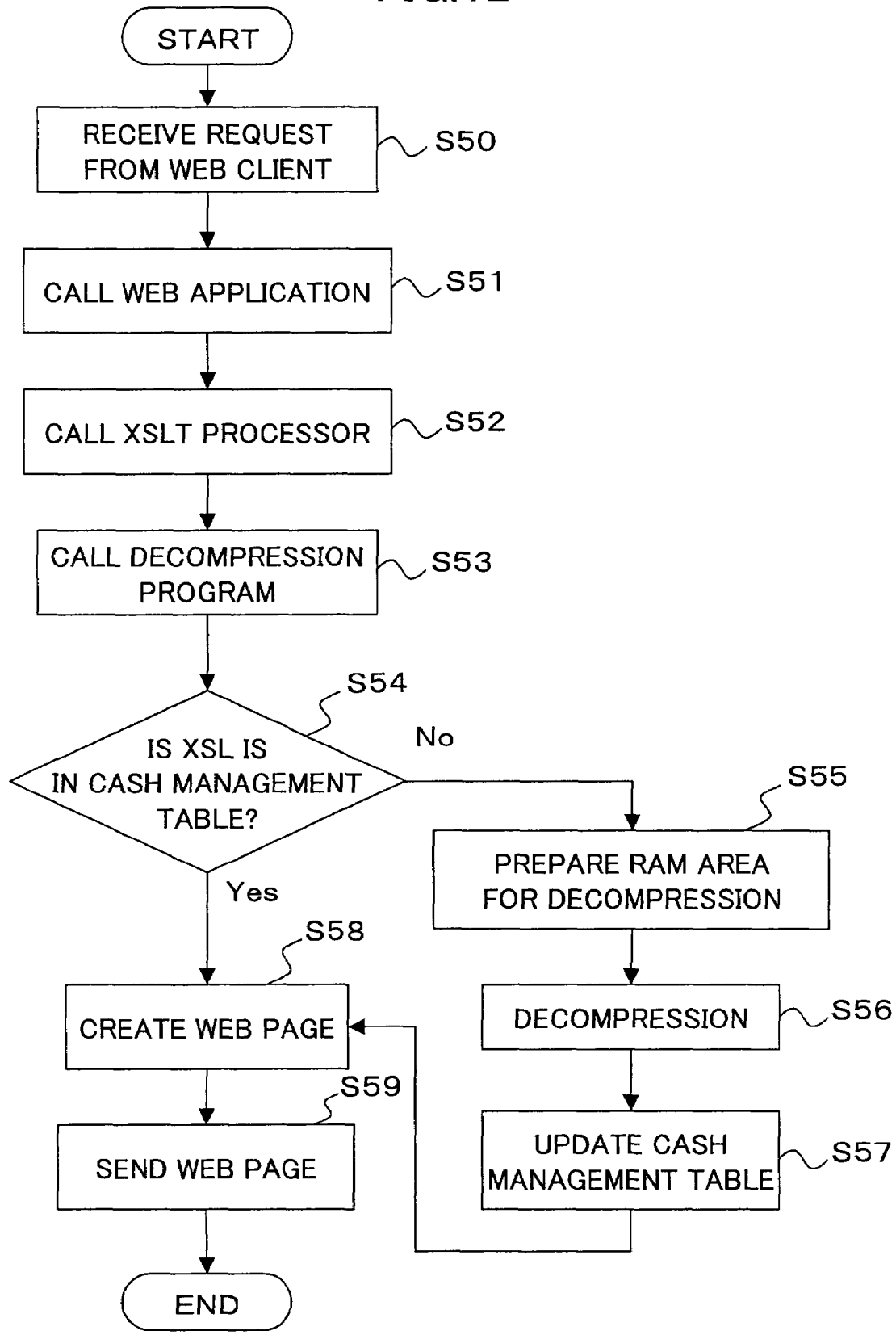
FIG. 12 is a flowchart of a process for decompressing an XSL file in the image processing apparatus according to the fourth embodiment.

FIG. 12 is a flowchart of a process for decompressing a compressed XSL file in the image processing apparatus 40.

Referring to FIG. 12, when the Web server program 45 receives an HTTP request from the Web client 100 at step S50, the process control of the image processing apparatus 40 moves to step S51.

At steps S51 through S53, the image processing apparatus 40 performs the same decompression process as steps S41 through S43 of the image processing apparatus 30. When the decompression program 44 is called, the process control moves to step S54.

At step S54, the decompression program 44 searches a cash management table for a compressed XSL file to be decompressed and determines whether or not the compressed XSL file is registered in the cash management table. The cash management table, which is described below in detail, is used to manage a list of decompressed XSL files in RAM 42. If the compressed XSL file to be decompressed is registered in the cash management table, that is, if the compressed XSL file has been already decompressed, the process control moves to step S58. On the other hand, if the compressed XSL file is not registered, that is, if the compressed XSL file has not been decompressed, the process control moves to step S55.

At steps S55 and S56, the decompression program 44 decompresses the designated compressed XSL file as in steps S44 and S45 of the image processing apparatus 30. The process control moves to step S57.

At step S57, the decompression program 44 registers the decompressed XSL data in the cash management table, and then the process control moves to step S58.

At steps S58 and S59, the image processing apparatus 40 creates a Web page as in steps S47 and S48 of the image processing apparatus 30 and then sends the Web page to the Web client 100.

In the following, the search process (S54) and the update process (S57) for such a cash management table are described in detail.

Figure 13:
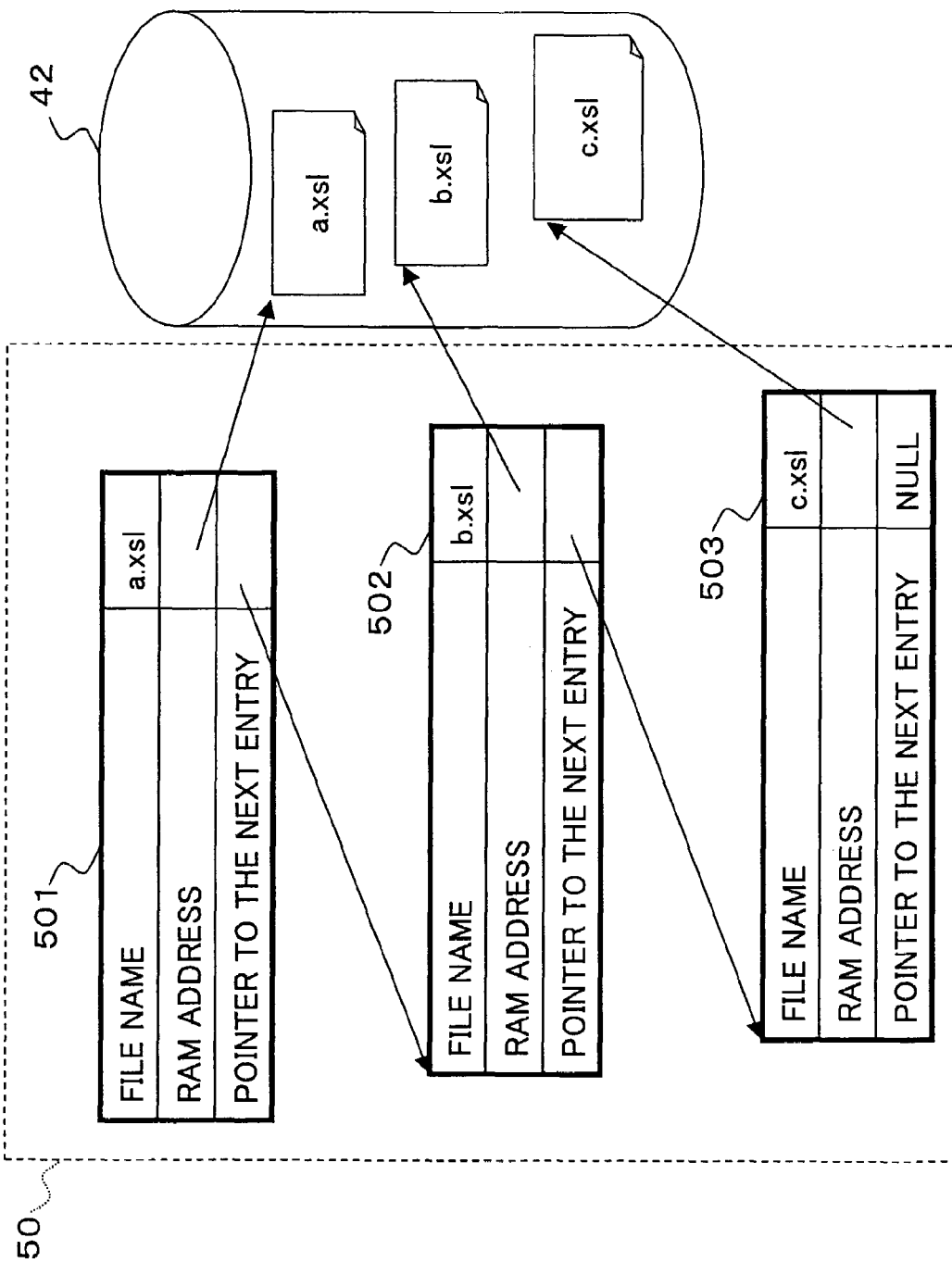
FIG. 13 is a diagram illustrating an exemplary cash management table having a list structure according to the fourth embodiment.

FIG. 13 is a diagram for explaining an exemplary cash management table having a list structure. Referring to FIG. 13, a list 50 comprises a cash entries 501 through 503. Each cash entry comprises a data item "file name", a data item "RAM address" and a data item "pointer to the next entry". In the data item "file name", file names of compressed XSL files are accommodated. In the data item "RAM address", addresses of memory areas in RAM 42, in which the decompressed XSL data are stored, are accommodated.

Figure 14:
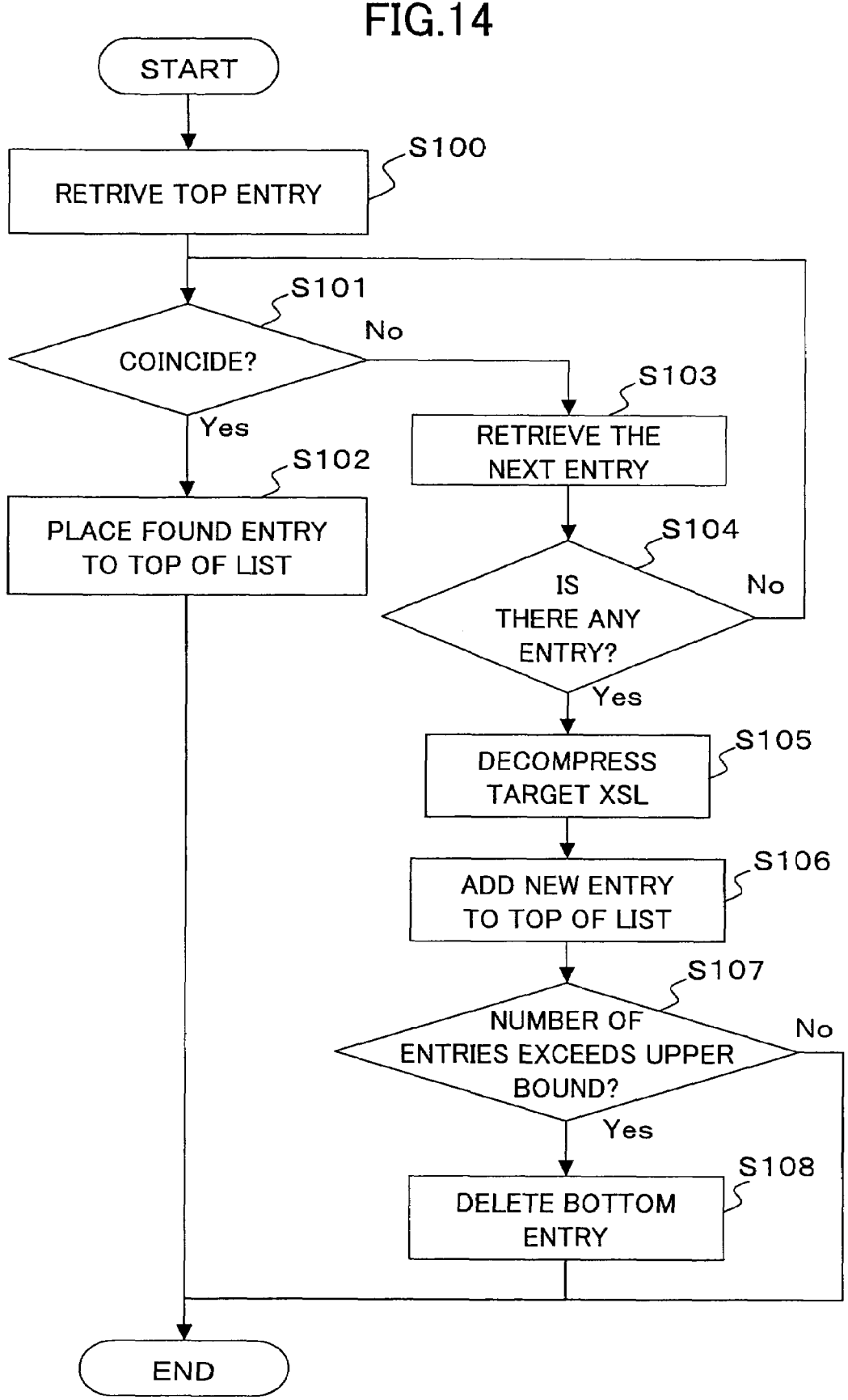
FIG. 14 is a flowchart of a process for searching and updating a cash management table in accordance with LRU method according to the fourth embodiment.

FIG. 14 is a flowchart of a process for searching and updating a cash management table, as illustrated in FIG. 13, in accordance with LRU (Least Recently Used) method, as appreciated by those skilled in the art. In FIG. 14, the flowchart corresponds to steps S54 through S57 in FIG. 12.

Referring to FIG. 14, the decompression program 44 retrieves a first cash entry from the list 50 at step S100 and determines whether or not the file name of the retrieved cash entry and the file name of the compressed XSL file to be decompressed are the same at step S101. If these file names are the same, the process control moves to step S102. On the other hand, if these file names are not the same, the process control moves to step S103.

At step S103, the decompression program 44 retrieves the next cash entry from the list 50 with reference to the data item "pointer to the next entry" of the first cash entry. The process control moves to step S104.

At step S104, the decompression program 44 determines whether or not the next cash entry is in the cash management table. For this determination, it is determined whether or not the value of the data item "pointer to the next entry" of the cash entry of interest is NULL. If the value of the data item "pointer-to the next entry" is NULL, the decompression program 44 determines that the next cash entry is not in the cash management table. If the next cash entry is registered in the cash management table, the process control moves to step S101.

At step S101, the decompression program compares the file name of the XSL file to be decompressed to the file name of the cash entry. If these file names are the same, it is determined that the XSL file to be decompressed has been already decompressed and the decompressed XSL data is in RAM 42. Then, the process control moves to step S102.

At step S102, the cash entry that should be currently processed is placed at the top of the list 50, and the search and update process is terminated. The cash entry is placed at the top of the list 50 because the cash entry of the most recently used XSL data is expected to be used for the first comparison of the next search. Here, when the decompression program 44 terminates the search and update process, the decompression program 44 retrieves the address of the decompressed XSL data in RAM 42 from the cash entry and informs the XSLT processor 47, which has called the decompression program 44, of the address.

On the other hand, if the cash entry corresponding to the compressed XSL file to be decompressed is not in the list 50 at step S104, the process control moves to step S105.

At step S105, the decompression program 44 decompresses the target compressed XSL file in ROM 41 and stores the decompressed XSL data in RAM 42. Step S105 correspond to steps S58 and S59 in FIG. 12. Then, the process control moves to step S106.

At step S106, the decompression program 44 generates a cash entry corresponding to the XSL data in RAM 42 and adds the cash entry to the top of the list 50. The process control moves to step S107.

At step S107, the decompression program 44 determines whether or not the number of cash entries in the list 50 exceeds a predetermined upper bound. The upper bound may be determined suitably to a memory capacity of RAM 42 or other factors. If the number of cash entries does not exceed the upper bound, the search and update process is terminated. On the other hand, if the number of cash entries exceeds the upper bound, the decompression program 44 deletes the bottom cash entry of the list 50 from the list 50 and sets the value of the data item "pointer to the next entry" of the immediately previous cash entry as NULL. Then, the decompression program 44 terminates the search and update process. The bottom cash entry is deleted in order to delete the least recently used XSL data from RAM 42 in accordance with the principle of the LRU method. Here, when the decompression program 44 terminates the search and update process, the decompression program 44 informs the XSLT processor 47, which has called the decompression program 44, of the address of the newly decompressed XSL data in RAM 42.

In the search and update process shown in FIG. 14, if the number of cash entries in the list 50 exceeds a predetermined upper bound, the least recently used cash entry, that is, the least recently used XSL data, is deleted from RAM 42 in accordance with the LRU principle, as appreciated by those skilled in the art. Alternatively, the oldest cash entry in the list 50 may be deleted. Namely, the XSL data that were decompressed the earliest in the list 50 may be deleted from RAM 42 in accordance with FIFO (First-In First-Out) method, as appreciated by those skilled in the art.

Figure 15:
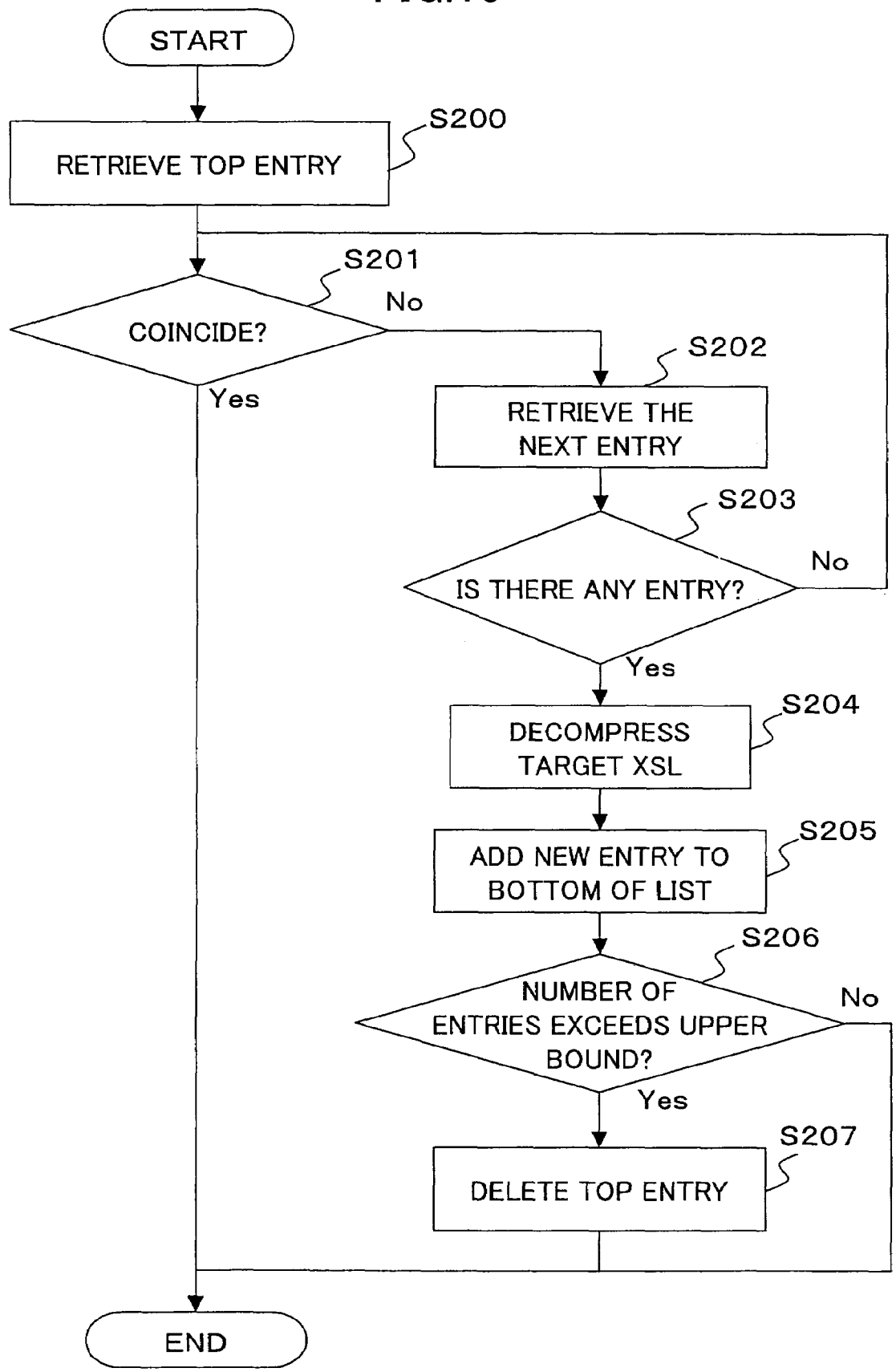
FIG. 15 is a flowchart of a process for searching and updating a cash management table in accordance with FIFO method according to the fourth embodiment.

FIG. 15 is a flowchart of a process for searching and updating a cash management table in accordance with the FIFO method. Referring to FIG. 15, the decompression program 44 retrieves a first cash entry from the list 50 at step S200. The process control moves to step S201.

At step S201, if the decompression program 44 finds a compressed XSL file corresponding to the retrieved cash entry (S201: YES) in the list 50, the search and update process is terminated without placing the cash entry at the top of the list 50. On the other hand, if the compressed XSL file is not in the list 50, the process control moves to step S202.

At steps S202 and S203, the decompression program 44 performs the same process as steps S103 and S104. The process control moves to step S204.

At step S204, the decompression program 44 newly decompresses a compressed XSL file to be decompressed. The process control moves to step S205.

At step S205, the decompression program 25 adds the created cash entry to the bottom of the list 50. If the number of cash entries in the list 50 exceeds a predetermined upper bound (S206: YES), the decompression program 44 deletes the top cash entry at step S207. In this fashion, the list 50 can be updated in accordance with the FIFO method.

According to the above-mentioned image processing apparatus 40, since a compressed XSL file is stored in ROM 41, it is possible to save a memory capacity of ROM 41. In addition, when the image processing apparatus 40 receives an HTTP request from the Web client 100, the image processing apparatus 40 decompresses only a compressed XSL file required to generate a Web page and stores the decompressed XSL data in RAM 42. As a result, the image processing apparatus 40 can operate without wasteful use of a memory area in RAM 42. Also, once a compressed XSL file is decompressed, the decompressed XSL data are stored in RAM 42. Accordingly, when the image processing apparatus 40 can use the same XSL data for the next request from the Web client 100, it is possible to maintain an appropriate response speed.

In the above-mentioned embodiments of the present invention, the present invention is applied to an image processing apparatus that can serve as a Web server. However, the present invention may be applied to a more general information processing apparatus that can serve as a Web server.

The present invention is not limited to the specifically disclosed embodiments, and variations and modifications may be made without departing from the scope of the present invention.

The present application is based on Japanese Patent Priority Applications No. 2002-258190 filed Sep. 3, 2002, and No. 2003-292492 filed Aug. 12, 2003, the entire contents of which are hereby incorporated by reference.

What is claimed is:

1. A method of generating and delivering HTML data corresponding to a URL request of a client by converting XML data in an information processing apparatus including a first storage means for storing a plurality of compressed XSL files in advance and a second storage means for temporarily storing an XSL data item corresponding to a decompressed XSL file, the method comprising the steps of:

receiving a URL request for a Web page from a client connected to the information processing apparatus via a network;

identifying a compressed XSL file corresponding to the URL request with reference to a correspondence table between compressed XSL files and URLs, the compressed XSL files required to create the Web page in the first storage means;

decompressing the identified compressed XSL files into one or more XSL data items and storing the resulting XSL data items in the second storage means;

using the XSL data items to create the requested Web page and deleting the used XSL data items from the second storage means; and sending the created Web page to the terminal.

2. The method as claimed in claim 1, wherein the identifying step comprises determining whether the decompressed XSL data items required to create the requested Web page are present in the second storage means; and if the required XSL data items are present in the second storage means, the using step comprises using the stored XSL data items to create the Web page; and the using step comprises, when the number of the XSL data items exceeds a predetermined value, deleting the least recently used XSL data item from said second storage means.

3. The method as claimed in claim 1, wherein the identifying step comprises determining whether the decompressed XSL data items required to create the requested Web page are present in the second storage means; and if the required XSL data items are present in the second storage means, the using step comprises using the stored XSL data items to create the Web page; and the using step comprises, when the number of the XSL data items exceeds a predetermined value, deleting the earliest stored XSL data item from said second storage means.

4. An information processing apparatus for generating and delivering HTML data corresponding to a URL request of a client by converting XML data, comprising:

a reception control part receiving a URL request for a Web page from a client connected to the information processing apparatus via a network;

first storage means for storing a plurality of compressed XSL files in advance;

a Web application providing a variety of services for the client, the Web application, in response to invoking the reception control part, generating a service processing result as XML data, the Web application including a correspondence table between the compressed XSL files and URLs;

a decompression part, in response to receipt of the request at the reception control part, identifying one or more compressed XSL files required to create the requested Web page in the first storage means and decompressing the identified compressed XSL files into one or more XSL data items;

second storage means for temporarily storing the decompressed XSL data items, said second storage means comprising a volatile memory;

a Web page creation part using the document form XSL data items stored in the second storage means to create the requested Web page and deleting the used XSL data items from the second storage means; and a transmission control part sending the created Web page to the requesting terminal, wherein the reception control part delivers the URL request to the Web application; and, in response to reception of the URL request, the Web application determines a compressed XSL file corresponding to the URL request with reference to the correspondence table and requests the Web page creation part to use an XSL data item corresponding to the determined compressed XSL file; and, in response to receipt of the request, the Web page creation part invokes the decompression part and instructs the decompression part to decompress the compressed XSL file.

5. The information processing apparatus as claimed in claim 4, wherein the decompression part determines whether the decompressed XSL data items required to create the requested Web page are present in the second storage means, and if the required XSL data items are present in the second storage means, the Web page creation part uses the stored XSL data items to create the Web page; and the Web page creation part, when the number of the XSL data items exceeds a predetermined value, deletes the least recently used XSL data item from the second storage means.

6. The information processing apparatus as claimed in claim 4, wherein the decompression part determines whether the decompressed XSL data items required to create the requested Web page are present in the second storage means, and if the required XSL data items are present in the second storage means, the Web page creation part uses the stored XSL data items to create the Web page; and the Web page creation part, when the number of the XSL data items exceeds a predetermined value, deletes the earliest stored XSL data item from the second storage means.

* * * * *